United States Patent [19]
Behlmer

[11] 4,399,896
[45] Aug. 23, 1983

[54] STEERING BRAKE AND CLUTCH CONTROL

[75] Inventor: Wilbur D. Behlmer, Dubuque, Iowa

[73] Assignee: Deere & Company, Moline, Ill.

[21] Appl. No.: 277,419

[22] Filed: Jun. 25, 1981

[51] Int. Cl.³ .......................................... F16D 67/04
[52] U.S. Cl. ............................... 192/13 R; 192/12 R
[58] Field of Search ................ 192/13 R, 13 A, 12 R; 180/6.2, 6.7

[56] References Cited

U.S. PATENT DOCUMENTS

| 29,293 | 7/1877 | Ehlke et al. | 192/13 |
| 3,494,449 | 2/1970 | Umeda et al. | 192/13 |
| 3,899,058 | 8/1975 | Pasquini | 192/13 |
| 4,044,849 | 8/1977 | Imon | 192/13 R X |
| 4,076,107 | 2/1978 | Yasoshima | 192/4 |
| 4,088,209 | 5/1978 | Drone | 192/13 R |

Primary Examiner—Ernest R. Purser

[57] ABSTRACT

A steering brake and clutch control for a crawler vehicle includes a pair of primary control levers, each of which, when operated by itself, acts through a spring to first effect disengagement of normally pressure-engaged clutch and then through a linkage to effect engagement of a brake. The clutch control levers are interconnected so that simultaneous actuation of the primary control levers results in both brakes being engaged without the clutches being disengaged. A pair of brake control levers have respective one-way connections with the pair of primary control levers and are spring-biased for simultaneously actuating the primary control levers to effect brake engagement. A pressure-operated plunger assembly is operative to maintain the brake control levers away from the primary control levers so long as sufficient hydraulic system pressure exists for normal operation.

5 Claims, 4 Drawing Figures

STEERING BRAKE AND CLUTCH CONTROL

BACKGROUND OF THE INVENTION

The present invention relates to controls for steering brakes and clutches of crawler vehicles and more specifically relates to controls for sequentially effecting the disengagement of a clutch at one side of a vehicle before application of the brake on that side when only one of the brakes is being applied but acting to prevent disengagement of either clutch when both brakes are being applied simultaneously. Exemplary of prior art steering controls, which operate in the manner just described, are the controls described in U.S. Pat. No. 3,494,449, granted on Feb. 10, 1970; U.S. Pat. No. Re. 29,293, granted on July 5, 1977 and U.S. Pat. No. 3,899,058, granted on Aug. 12, 1977.

Heretofore, prior art steering controls of the above-described type have suffered from one or more of the drawbacks of having relatively complex linkages and/or valving, of lacking compactness, and of lacking the ability to automatically effect engagement of the brakes in response to the loss of hydraulic system pressure as would happen in the event of a failure in some components of the system or in the event of the vehicle engine stalling, for example.

SUMMARY OF THE INVENTION

According to the present invention, there is provided an improved control for steering brakes and clutches of crawler vehicles.

An object of the invention is to provide a steering brake and clutch control which involves simple linkage and valve components.

Another object of the invention is to provide a steering brake and clutch control of the type described wherein the components thereof are compactly arranged.

Yet another object of the invention is to provide a steering brake and clutch control of the type described wherein the control operates automatically in response to a loss of hydraulic system pressure, to effect engagement of the steering brakes.

The foregoing objects and others which may become apparent from a reading of the following description in conjunction with the appended drawings are accomplished by providing a control including a pair of primary control levers respectively linked to right- and left-hand steering brakes and respectively connected by means of a pair of springs, to right- and left-hand clutch control levers, the primary control levers operating when separately actuated, to first effect disengagement of the associated clutch and then to effect engagement of the associated brake. The clutch control levers are interlocked such that simultaneous operation of the primary control levers effects engagement of both brakes but does not effect disengagement of the clutches. A pair of brake control levers respectively have one-way connections with the pair of primary control levers and are biased to simultaneously move the primary control levers to effect engagement of the brakes. A pressure-operated plunger assembly is provided for blocking the brake control levers from moving the primary control levers for effecting engagement of the brakes so long as the hydraulic system pressure is sufficient for normal operation.

DESCRIPTION OF THE PREFERRED EMBODIMENT

Figure 1:
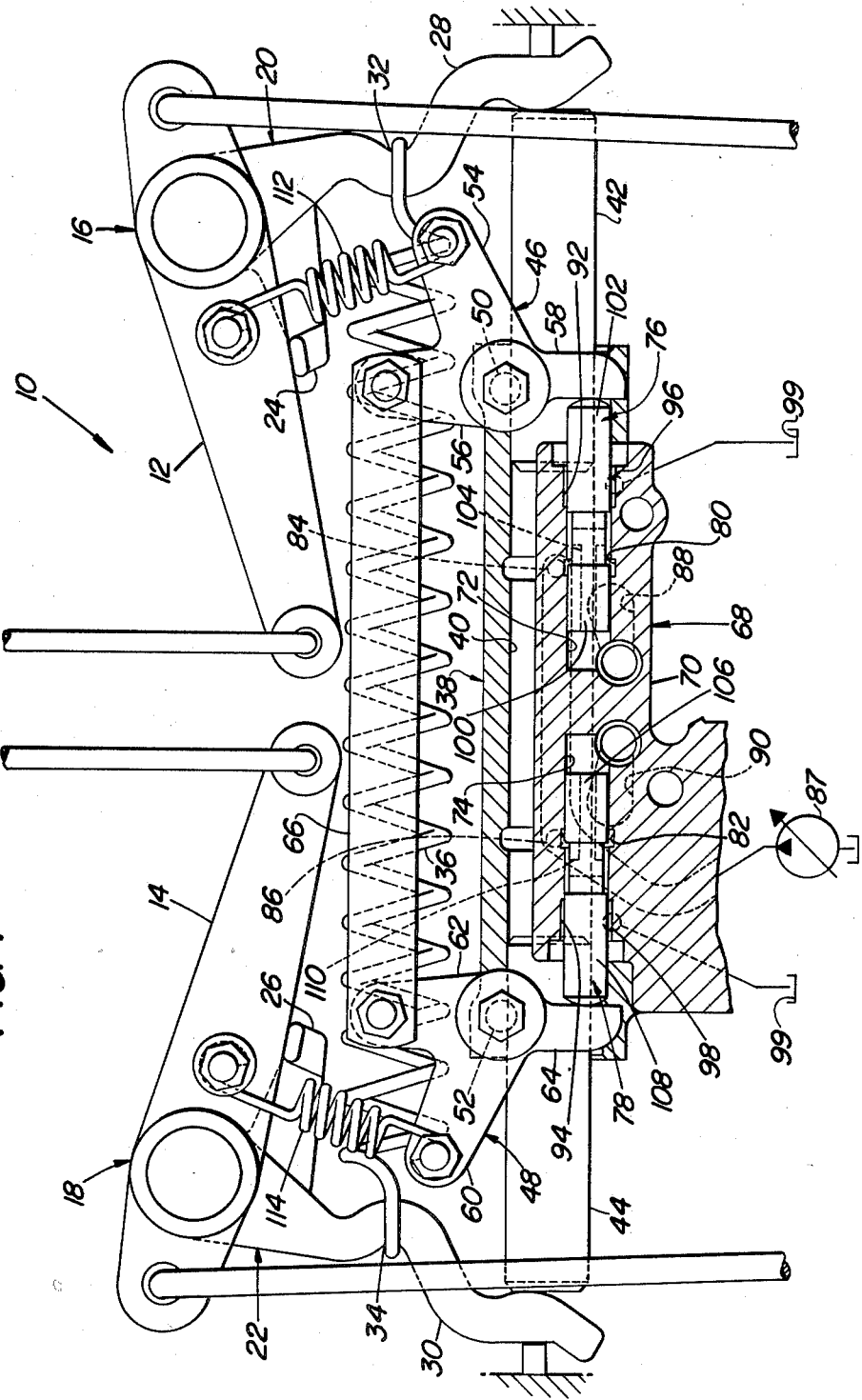
FIG. 1 is a top plan view, with portions shown in section, of the steering control of the present invention with the components thereof positioned for effecting straight ahead travel.
Figure 2:
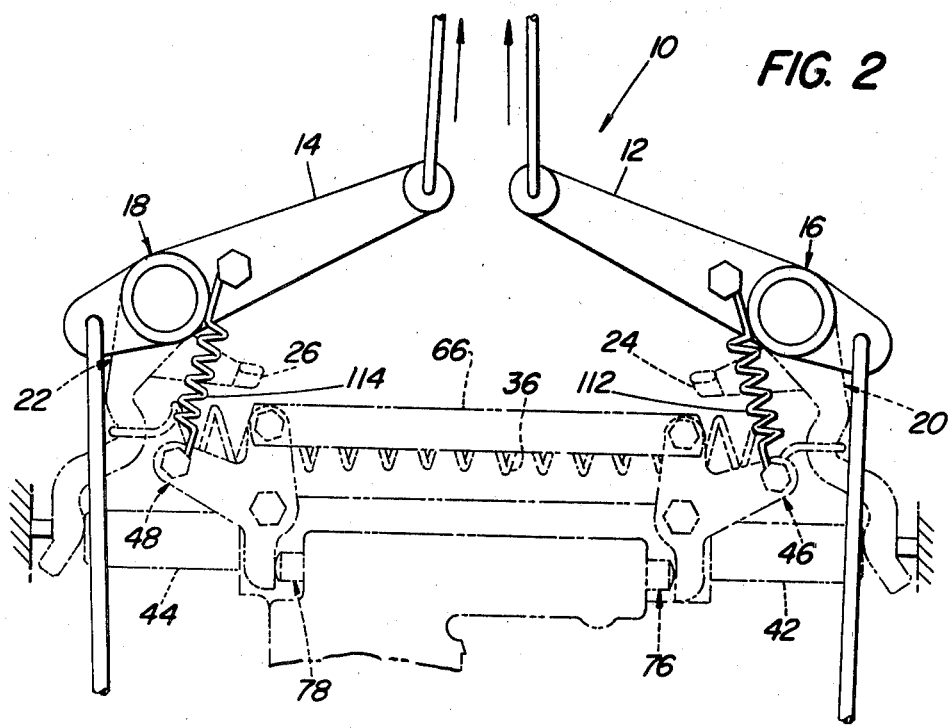
FIGS. 2 through 4 are schematic representations of the control of FIG. 1, but respectively showing the components positioned for effecting a fully braked condition when manually initiated, a right-hand turn, and a fully braked condition when automatically initiated.

Referring now to the drawings, therein is shown a crawler tractor steering brake and clutch control system indicated in its entirety by the reference numeral 10. The control system 10 includes right- and left-hand primary control levers 12 and 14, respectively, mounted at respective connections 16 and 18 for clockwise and counterclockwise pivotal movement about a pair of parallel axes from respective brake-release positions, as shown in FIG. 1, to brake-apply positions, as shown in FIG. 2.

Provided for automatically moving the primary control levers 12 and 14 from their respective brake-release to their respective brake-apply positions are right- and left-hand brake-control levers 20 and 22, respectively. The levers 20 and 22 are respectively mounted for pivotal movement coaxial with the levers 12 and 14 and respectively include drive lugs 24 and 26 disposed to trail in the paths swept by the levers 12 and 14 as the latter move from their brake-release to their brake-apply positions. As viewed in FIG. 1, the brake-control levers 20 and 22 respectively include depending arms 28 and 30 which are curved to define oppositely facing spring-end seats 32 and 34. A tension spring 36 is stretched between the arms 28 and 30 and has hooks formed at its opposite ends and respectively received in the seats 32 and 34. Thus, the levers 20 and 22 are respectively biased to rotate clockwise and counterclockwise. Provided for preventing rotation of the levers 20 and 22 when the tractor hydraulic system (not completely shown) is operational for supplying hydraulic fluid pressure thereto is a hydraulic actuator 38 including a cylinder 40 having plungers 42 and 44 respectively projecting from its right- and left-hand ends.

Figure 4:
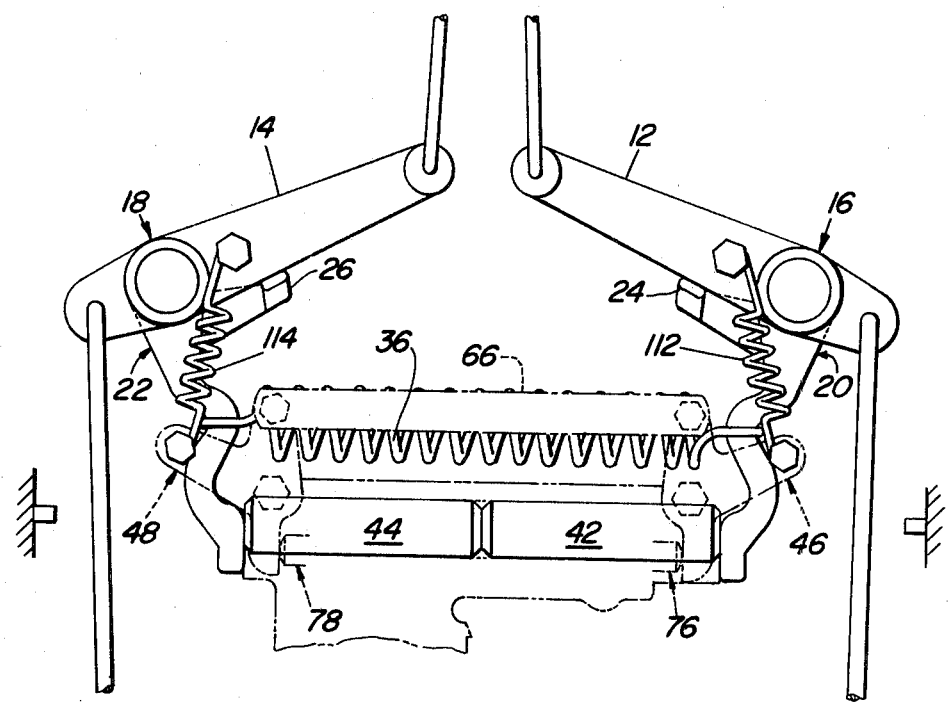

The hydraulic system includes a connection for supplying fluid pressure to the cylinder 40 at a location between the plunger ends and when the hydraulic system is supplying adequate fluid pressure, the plungers 42 and 44 are respectively pressure-engaged with the lower end portions of the depending arms 28 and 30 of the levers 20 and 22 and hold the latter in respective inoperative positions with their drive lugs 24 and 26 disposed in adjacent spaced relationship to the levers 12 and 14. If the hydraulic system should fail to supply adequate fluid pressure, as when the vehicle engine stops, for example, the pressure acting on the plungers 42 and 44 will no longer be adequate to keep the latter extended and the spring 36 will act to rotate the levers 20 and 22 clockwise and counterclockwise, respectively, which results in the drive lugs 24 and 26 coming into engagement with and rotating the levers 12 and 14 to their respective brake-apply positions, as shown in FIG. 4.

Provided for controlling the disengagement of right- and left-hand, normally hydraulically-engaged clutches (not shown) are right- and left-hand clutch control levers 46 and 48. The levers 46 and 48 are respectively pivotally mounted, as at 50 and 52, for movement about axes which extend parallel to each other and, as viewed in FIG. 1, are respectively located below and inwardly towards each other relative to the pivotal connections 16 and 18 of the primary control levers 12 and 14. The levers 46 and 48 are each in the form of a bell crank with the lever 46 including a rightwardly extending input leg 54, an upwardly projecting leg 56 and a downwardly projecting valve-operating leg 58, and with the lever 48 including a leftwardly extending input leg 60, an upwardly projecting leg 62 and a downwardly projecting valve-operating leg 64. The legs 56 and 62 are interlocked by a link 66 which prevents simultaneous pivotal movement of the levers 46 and 48 respectively counterclockwise and clockwise from their respective normal clutch-engage positions shown in FIG. 1. A steering clutch control valve 68 includes a valve body 70 extending between the valve-operating legs 58 and 64 of the levers 46 and 48. The body 70 defines blind bores 72 and 74 which respectively open towards the legs 58 and 64 and contain valve spools 76 and 78 respectively including outer ends disposed in contact with the legs 58 and 64. Selected individual movement of the levers 46 and 48 results in the spools shifting axially to control clutch-engage pressure, in a manner described more fully below, so as to selectively effect gradual or sharp turns.

The bores 72 and 74 respectively include annular recesses 80 and 82 located medially of their respective opposite ends. Leading to the recesses 80 and 82 are inlet ports 84 and 86, respectively, which are adapted for connection to a fluid pressure supply pump 87. Intersecting the bores 72 and 74 at respective locations adjacent the closed ends of the bores are outlet ports 88 and 90, which are adapted for connection to pressure-operable actuators (not shown) of normally hydraulically-engaged right- and left-hand clutches. The bores 72 and 74 respectively include annular recesses 92 and 94 located adjacent the respective open ends of the bores and leading from the recesses 92 and 94 are sump ports 96 and 98, which are adapted for connection to a sump 99 of the hydraulic system.

The valve spool 76 includes inner and outer axially spaced lands 100 and 102 and an internal passage 104 extending between and being in fluid communication with the space between the lands 100 and 102 and the inner end of the spool 76. When the spool 76 is in a normal clutch-engage position, as shown in FIG. 1, the internal passage 104 establishes a fluid connection between the inlet port 84 and the outlet port 88 while the outer land 102 is located for blocking fluid communication between the ports 84 and 88 and the sump ports 96. Full clutch-engagement pressure is then provided to the actuator for the right-hand clutch. Conditions of partial clutch disengagement may be established by controlling the spool 76 to shift rightwardly from its normal clutch-engage position. Specifically, as the rightward displacement of the spool 76 increases, the lands 100 and 102 will respectively increasingly restrict the flow from the recess 80 and increasingly open flow to the recess 92 to thereby decrease the communication of the outlet port 88 with the inlet port 84 while increasing the communication of the outlet port 88 with the sump port 96. When the spool 76 reaches a rightward extreme position; it will be in a clutch-release position wherein the inner land 100 is in blocking relationship to the inlet port 84 while the outlet port 88 is connected to the sump port 96 by way of the internal passage 104. The right-hand clutch will then be fully released since no engagement pressure will be available from the inlet port and all engagement pressure will be drained to the sump.

Similarly, the valve spool 78 includes inner and outer axially spaced lands 106 and 108 and an internal passage 110 having one end in communication with the space between the lands and a second end in fluid communication with the space between the inner end of the spool and the outlet port 90. The spool 78 is also shown in FIG. 1 in a normal clutch-engage position wherein the lands 106 and 108 are located so as to place the inlet port 86 and the outlet port 90 in fluid communication with each other by way of the internal passage 110. The outer land 108 is then located so as to block communication between the sump port 98 and the ports 86 and 90. The valve spool 78 may be controlled to shift leftwardly to establish conditions of increasing partial disengagement of the left-hand clutch as the leftward displacement of the spool 78 increases. Specifically, as the spool 78 moves leftwardly, the land 106 will increasingly restrict flow from the recess 82 and, hence, the inlet port 86 while increasingly opening flow to the recess 94 and, hence the sump port 98. When the spool arrives at an extreme leftward position it will be in a clutch-release position wherein the lands 106 and 108 are located such as to establish fluid communication between the outlet port 90 and the sump port 98 while blocking flow from the inlet port 86. The left-hand clutch will then be fully released, since no engagement fluid pressure will be available from the inlet port, and all engagement pressure will be drained to the sump.

Figure 3:
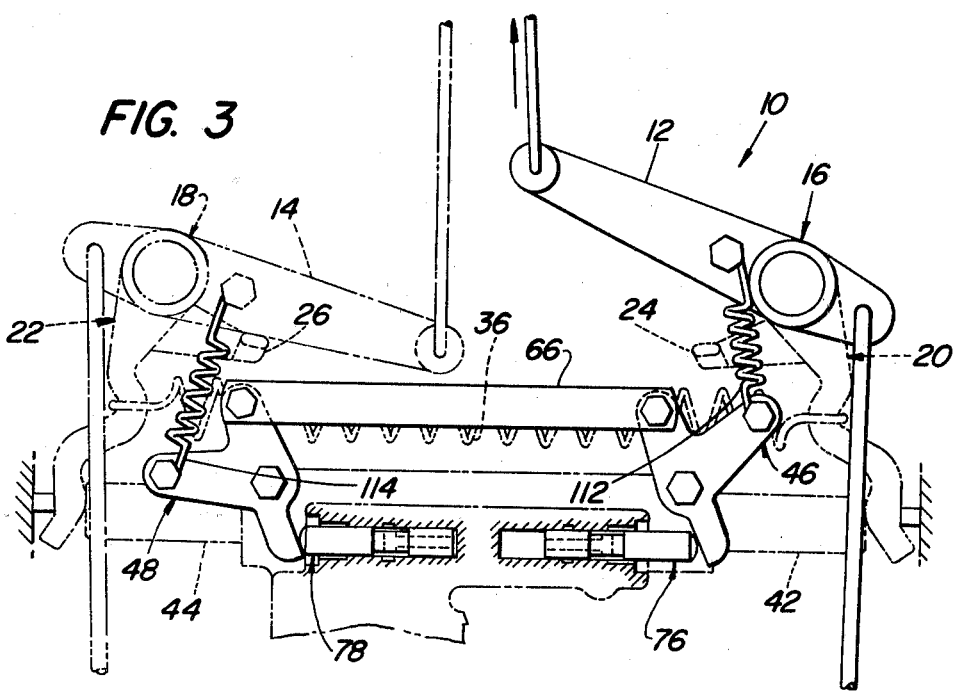

Connected between the primary control levers 12 and 14 and the input legs 54 and 60 of the clutch control levers 46 and 48, respectively, are tension coil springs 112 and 114. As is illustrated in FIG. 2, the springs 112 and 114 cooperate with the interlock link 66 to permit simultaneous movement of the primary control levers 12 and 14 to effect engagement of the right- and left-hand brakes while retaining the clutch control levers 46 and 48 and the valve spools 76 and 78 in their respective normal clutch-engage positions. On the other hand, the springs 112 and 114 act together with the link 66 to effect selected partial or complete disengagement of the right- and left-hand steering clutches respectively in response to individual operation of the primary control levers 12 and 14. For example, upon the primary lever 12 being rotated clockwise from its brake-release position, shown in FIG. 1, toward its brake-engage position, as illustrated in FIG. 3, the spring 112 will act to rotate the clutch control lever 46 counterclockwise resulting in the leg 58 thereof moving rightwardly to let the clutch-engagement pressure acting on the left-hand end of the spool 76 shift the latter rightwardly to effect partial or complete disengagement of the right-hand clutch in the manner discussed above. The counterclockwise rotation of the lever 46 is transferred, by way of the link 66, to the lever 48, which likewise rotates clockwise. While this movement of the lever 48 results in the valve spool 78 being shifted inwardly, this movement of the spool is merely overtravel and does not effect any operational change in the control of the left-hand clutch.

Similarly, partial or complete disengagement of the left-hand clutch may be accomplished by rotating the primary control lever 14 counterclockwise from its brake-release position shown in FIG. 1 to its brake-engage position shown in FIG. 2. This will result in the spring 114 acting to rotate the clutch control lever 48 clockwise resulting in the spool 78 being shifted leftwardly by clutch-engage pressure acting on its right-hand end. This leftward movement effects partial or complete disengagement of the left-hand clutch in the manner discussed above.

It is here noted that the clutch control levers 46 and 48 may be interlocked against simultaneous rotation in opposite directions by means other than the link 66. For example, the levers could be provided with intermeshed gear tooth segments.

I claim:

1. A steering brake and clutch control, comprising: first and second primary control levers respectively pivotally mounted for movement about first and second parallel axes between respective brake-release and brake-engage positions; first and second clutch control levers respectively pivotally mounted for movement about third and fourth parallel axes between respective clutch-engage and clutch-release positions; first and second valve means respectively operatively associated with the first and second clutch control levers and controlled by the latter so as to be respectively conditioned for routing pressure fluid for effecting clutch-engagement when the first and second clutch control levers are in their clutch-engage positions for draining clutch-engagement pressure when the first and second clutch control levers are in their clutch-release positions and for partially draining clutch-engagement pressure to establish partial clutch-disengagement when the first and second control levers are in intermediate positions between their clutch-engage and clutch-release positions; interlocking means interconnecting the first and second clutch control levers for preventing simultaneous rotation of the latter from their respective clutch-engage to their respective clutch-release positions while permitting the first and second clutch control levers to be individually rotated; first and second yieldable connection means respectively interconnecting the first primary control lever and the first clutch control lever, and interconnecting the second primary control lever and the second clutch control lever; said first and second yieldable connection means being respectively located for causing the first and second clutch control levers to move toward their respective clutch-disengage positions when the first and second primary control levers are moved toward their respective brake-engage positions.

2. The steering brake and clutch control defined in claim 1 wherein the first and second clutch control levers each include a first leg and the interlocking means includes a link having opposite ends respectively pivotally connected to the first leg of the first and second clutch control levers.

3. The steering brake and clutch control defined in claim 1 wherein said first and second yieldable connection means respectively include first and second tension springs.

4. The steering brake and clutch control defined in claim 1 wherein the first and second valve means respectively include first and second axially aligned valve spools and wherein the first and second clutch control levers include respective second legs engaged with respective first ends of the valve spools.

5. The steering brake and clutch control defined in claim 1 and further including first and second secondary control lever means respectively mounted for movement, adjacent the first and second primary control levers, between first and second positions and respectively including first and second one-way connection means connecting them with the first and second primary control levers for moving the latter from their respective brake-release to their respective brake-engage positions as the secondary control levers are moved from their respective first to their respective second positions; biasing means connected to the first and second secondary control levers and urging the latter towards their respective second positions; and pressure-sensitive secondary lever control means operatively connected to the first and second secondary control levers for maintaining the latter in their respective first positions only when the secondary lever control means is receiving a fluid pressure signal indicative of normal operation.

* * * * *